US007883198B2

(12) United States Patent
McCracken et al.

(10) Patent No.: US 7,883,198 B2
(45) Date of Patent: Feb. 8, 2011

(54) RAPID RESPONSE ONE-WAY VALVE FOR HIGH SPEED SOLID INK DELIVERY

(75) Inventors: Ivan McCracken, Portland, OR (US); Larry Hindman, Woodburn, OR (US); Steven L. Estergreen, Mulino, OR (US)

(73) Assignee: Xerox Corporation, Norwalk, CT (US)

( * ) Notice: Subject to any disclaimer, the term of this patent is extended or adjusted under 35 U.S.C. 154(b) by 406 days.

(21) Appl. No.: 12/113,621

(22) Filed: May 1, 2008

(65) Prior Publication Data

US 2009/0273657 A1 Nov. 5, 2009

(51) Int. Cl.
*G01D 11/00* (2006.01)

(52) U.S. Cl. .......................................... 347/99; 347/88

(58) Field of Classification Search .................. 347/85, 347/86, 88, 99, 100

See application file for complete search history.

(56) References Cited

U.S. PATENT DOCUMENTS 4,712,583 A 12/1987 Pelmulder et al.
4,867,140 A 9/1989 Hovis et al.
6,089,534 A 7/2000 Biegelsen et al.
6,685,307 B2 * 2/2004 Dowell et al. ................. 347/85
6,793,819 B2 9/2004 Glenwright et al.
6,799,844 B2 10/2004 Leighton et al.
6,905,201 B2 6/2005 Leighton
7,108,361 B2 * 9/2006 Kitabatake et al. ............ 347/86
7,188,941 B2 3/2007 Platt et al.
7,300,143 B2 11/2007 Slotto et al.
2004/0114008 A1 6/2004 Leighton et al.
2005/0146573 A1 7/2005 Platt
2005/0146575 A1 7/2005 Hill
2005/0146582 A1 7/2005 Platt

OTHER PUBLICATIONS

European Search Report, European Patent Office, Munich, DE, Jul. 15, 2009, 9 pages.

* cited by examiner

*Primary Examiner*—Ellen Kim
(74) *Attorney, Agent, or Firm*—Maginot, Moore & Beck LLP

(57) ABSTRACT

A valve assembly is provided for a high-speed phase change ink image producing machine between a first storage reservoir for receiving and holding a first volume of melted ink from a source and a second storage reservoir for holding a second volume of melted ink to be delivered under pressure to a printhead system. The valve assembly includes a passive valve disc movable from the closed position in which said disc abuts a valve seat in sealed contact, and an open position in which said valve disc is supported by an angled surface. An upper portion of the valve disc is unsupported and a flow director surface behind the disc directs fluid flow against the upper portion to assist in closing the valve. The surface characteristics of the valve seat are controlled to improve the "crack" time of the valve disc when opening.

19 Claims, 5 Drawing Sheets

RAPID RESPONSE ONE-WAY VALVE FOR HIGH SPEED SOLID INK DELIVERY

BACKGROUND

The following disclosure relates to image producing machines, and more particularly to solid ink machines that use a phase change ink melting and control apparatus.

In general, phase change ink image producing machines, such as printers, employ phase change inks that are in the solid phase at ambient temperature, but exist in the molten or melted liquid phase (and can be ejected as drops or jets) at the elevated operating temperature of the machine or printer. At such an elevated operating temperature, droplets or jets of the molten or liquid phase change ink are ejected from a printhead device of the printer onto a printing media. Such ejection can be directly onto a final image receiving substrate, or indirectly onto an imaging member before transfer from it to the final image receiving media. In any case, when the ink droplets contact the surface of the printing media, they quickly solidify to create an image in the form of a predetermined pattern of solidified ink drops.

An example of such a phase change ink image producing machine or printer, and the process for producing images therewith onto image receiving sheets is disclosed in U.S. Pat. No. 6,905,201, issued on Jun. 14, 2005, to Leighton et al., the disclosure of which is incorporated herein by reference. As disclosed therein, a high-speed phase change ink image producing machine, such as printer 10 shown in FIG. 1, includes a frame 11 to which are mounted directly or indirectly all its operating subsystems and components. One of the components is an imaging member 12 that is shown in the form of a drum, but can equally be in the form of a supported endless belt. The imaging member 12 has an imaging surface 14 that is movable in the direction 16, and on which phase change ink images are formed.

The high-speed solid ink printer 10 also includes a phase change ink system 20 that has at least one source 22 of a single color phase change ink in solid form. When the printer 10 is a multicolor image producing machine, the ink system 20 includes four sources 22, 24, 26, 28, representing four different colors CYMK (cyan, yellow, magenta, black) of phase change ink solid pieces, as shown in FIG. 1. The phase change ink system 20 also includes a solid phase change ink melting and control assembly or apparatus 100 (FIG. 2) for melting or phase changing the solid form of the phase change ink into a liquid form, and for then supplying the liquid form towards the printhead system 30. The printhead system 30 includes at least one printhead assembly 32, or in the case of a high-speed, or high throughput, multicolor image producing machine, four separate printhead assemblies 32, 32, 36 and 38, as shown in FIG. 2.

The solid ink image producing printer 10 further includes a substrate supply and handling system, which may, for example, include multiple substrate supply sources 42, 44, 46, 48. The substrate supply and handling system further includes a substrate treatment system 50 that has a substrate pre-heater 52, substrate and image heater 52, and a fusing device 60. The phase change ink image producing printer 10 as shown may also include an original document feeder 70 that has a document holding tray 72, document sheet feeding and retrieval devices 72, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 82, and a display or user interface (UT) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32, 32, 36, 38. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32, 32, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 12 thus forming desired images per such image data, and receiving substrates are supplied by anyone of the sources 22, 22, 26, 28 and handled by means 50 in timed registration with image formation on the surface 12. Finally, the image is transferred within the transfer nip 92, from the surface 12 onto the receiving substrate for subsequent fusing at fusing device 60.

Thus an exemplary high-speed phase change ink image producing machine 10 includes: (a) a control subsystem 80 for controlling operation of all subsystems and components thereof, (b) a movable imaging member 12 having an imaging surface 14; (c) a printhead system 30 connected to the control subsystem 80 for ejecting drops of melted molten liquid ink onto the imaging surface 12 to form an image; and (d) a phase change ink system 20 connected to the printhead system 30.

In one embodiment, the phase change ink system 20 includes a solid phase change ink melting and control apparatus 100 (FIG. 2), including a pre-melter assembly 200 and a melter assembly 300. The pre-melter assembly 200 is suitable for controllably supplying solid pieces of phase change ink from the sources 22, 22, 26, 28 to the melter assembly 300 located below the pre-melter assembly 200, and more particularly to the separate melters 300A-D. A melted molten liquid ink storage and control assembly 400 is located below the melter assembly 300. The phase change ink melting and control apparatus 100 is thus suitable for melting solid phase change ink into melted molten liquid ink, and for controlling the melted molten liquid ink.

In high throughput solid ink systems, the storage and control assembly 400 may incorporate a dual reservoir system, as illustrated in FIG. 3, corresponding to each of the individual melters 300A-D for the various colors implemented in the solid in system. In this system, molten liquid ink is fed from a corresponding melter 300A-D into an associated primary reservoir 402, which stores a first volume of melted ink for subsequent use. This reservoir is connected by a conduit or passageway 406 to a secondary reservoir 404, which stores a second volume of melted liquid ink. The liquid ink is ejected from the secondary reservoir at outlet 410 and typically through a heated routing system to reach a respective printhead or printheads of the printhead assembly 30. In systems of this type, pressurized air P is provided at port 412 to act on the free surface of the liquid ink in the secondary reservoir to discharge ink into the outlet 410. The volume of ink in the primary reservoir 402 is typically maintained at atmospheric pressure.

As shown in FIG. 3, the level of the two volumes of ink in the primary and the secondary reservoirs 402, 404 is the same under equilibrium conditions. It can be appreciated that after liquid ink has been dispensed under pressure through the outlet 410, the ink level in the secondary reservoir will drop, as depicted in FIG. 3. Once the pressurized air at port 412 ceases, the pressure above the surface of the second volume of ink in the secondary reservoir returns to atmospheric. However, due to the difference in ink height, a fluid pressure differential results between the two reservoirs. This pressure differential causes molten ink to flow from the primary reservoir 402, through the passageway 406 and into the secondary reservoir 404 until the respective ink heights or levels equilibrate. Thus, a supply of liquid ink is always at the ready within the secondary reservoir 404, even as new molten ink is directed into the primary reservoir 402. The supply of ink to be discharged at the printhead assembly is therefore never interrupted, at least as long as the flow of melted ink to the primary reservoir is not interrupted.

In dual reservoir systems of this type, a one-way valve 408 must be interposed into the passageway 406 between the two reservoirs. The valve 408 is operable to permit flow ink from the primary reservoir to the secondary, but not in the opposite direction. The valve 408 is thus closed when the secondary reservoir is pressurized to discharge molten ink to the printhead assembly.

The valve 408 in one typical system is mechanically actuated under power, and under control of the control subsystem 80. Actuated valves of this type are opened and closed in timing with the application and release of pressure to the secondary reservoir. Valves of this type are often costly and occupy significant space within the machine 10.

In another type of system, the valve 408 is a ball valve, which operates passively as a function of the pressure differential between the two reservoirs. When the ink level in the secondary reservoir 404 is low, the pressure differential favors the primary reservoir 402, so the ball valve opens. When the secondary reservoir is pressurized, the differential shifts to favor the secondary reservoir and the fluid pressure pushes the ball valve closed against its seat to prevent ink flowing back into the primary reservoir. Passive ball valves, although generally more economical from a cost and space standpoint, react more slowly than the mechanically actuated valves. The slow reaction times of passive ball valves place a limit on the throughput speed of the storage and control assembly 400, and therefore a limit on the print speed of the machine 10. Moreover, the slow closing rate allows more ink to leak past the ball valve before the seal is made, which in turn leads to a decrease in system performance.

There is therefore a need for a valve system for dual reservoir molten liquid ink systems that is capable of high throughputs, that fits within a limited envelop in the machine and that is cost efficient.

SUMMARY

According to aspects illustrated herein, there is described a valve assembly disposed between primary and secondary reservoirs of a phase change ink image producing machine. The valve assembly is operable in an open position to control the flow of melted ink from the first storage reservoir to the second storage reservoir and in a closed position to prevent backflow into the first storage reservoir of melted ink being delivered under pressure to the printhead system. In one embodiment, the valve assembly comprises a valve housing defining a valve seat between the first and second reservoirs, an angled surface disposed within the valve housing, and a passive valve disc disposed within the valve housing and movable from the closed position in which the disc abuts the valve seat in sealed contact, and the open position in which the valve disc is supported by the angled surface. In one feature, the angled surface is configured to support only a portion of the valve disc with an upper portion thereof unsupported. The valve housing further defines a flow director surface at the upper portion of the valve disc on the opposite side of the disc from the valve seat. This surface is in fluid communication with the secondary reservoir to direct a flow of melted ink behind the valve disc to help lift the valve disc off the angled surface when moving from the open position to the closed position.

In another aspect, the valve seat defines a sealing surface having a plurality of micro-channels defined therein to permit fluid flow therethrough when the valve disc abuts the valve seat. The micro-channels thus allows the fluid to equilibrate on either side of the valve disc to thereby improve, or reduce, the "crack" time of the valve disc from the closed position. In another feature, the sealing surface has an average surface roughness of between 0.3 and 1.0 μm and a peak-to-valley ratio of heights of less than 10 μm across the entire sealing surface. This feature improves the valve crack time without sacrificing the sealing capability of the valve disc and valve seat.

The valve assembly disclosed herein is well-suited for use in a high throughput, high speed phase change ink image producing machine, such as a high speed solid ink printer. The valve assembly provides very fast closing and opening rates with negligible leakage.

DETAILED DESCRIPTION OF THE EMBODIMENTS

Figure 1:
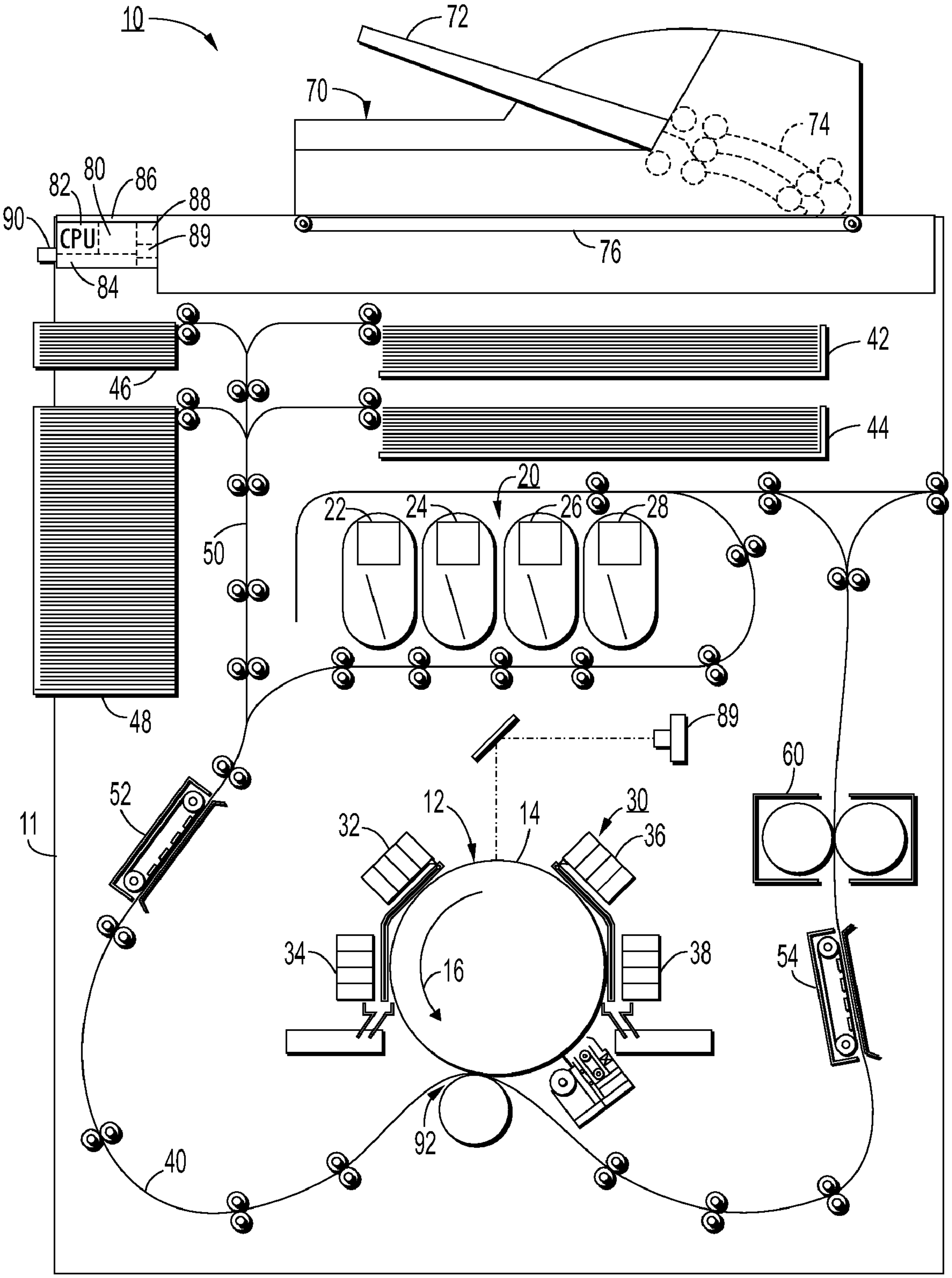
FIG. 1 is a vertical schematic of a high-speed phase change ink image producing machine or printer.
Figure 2:
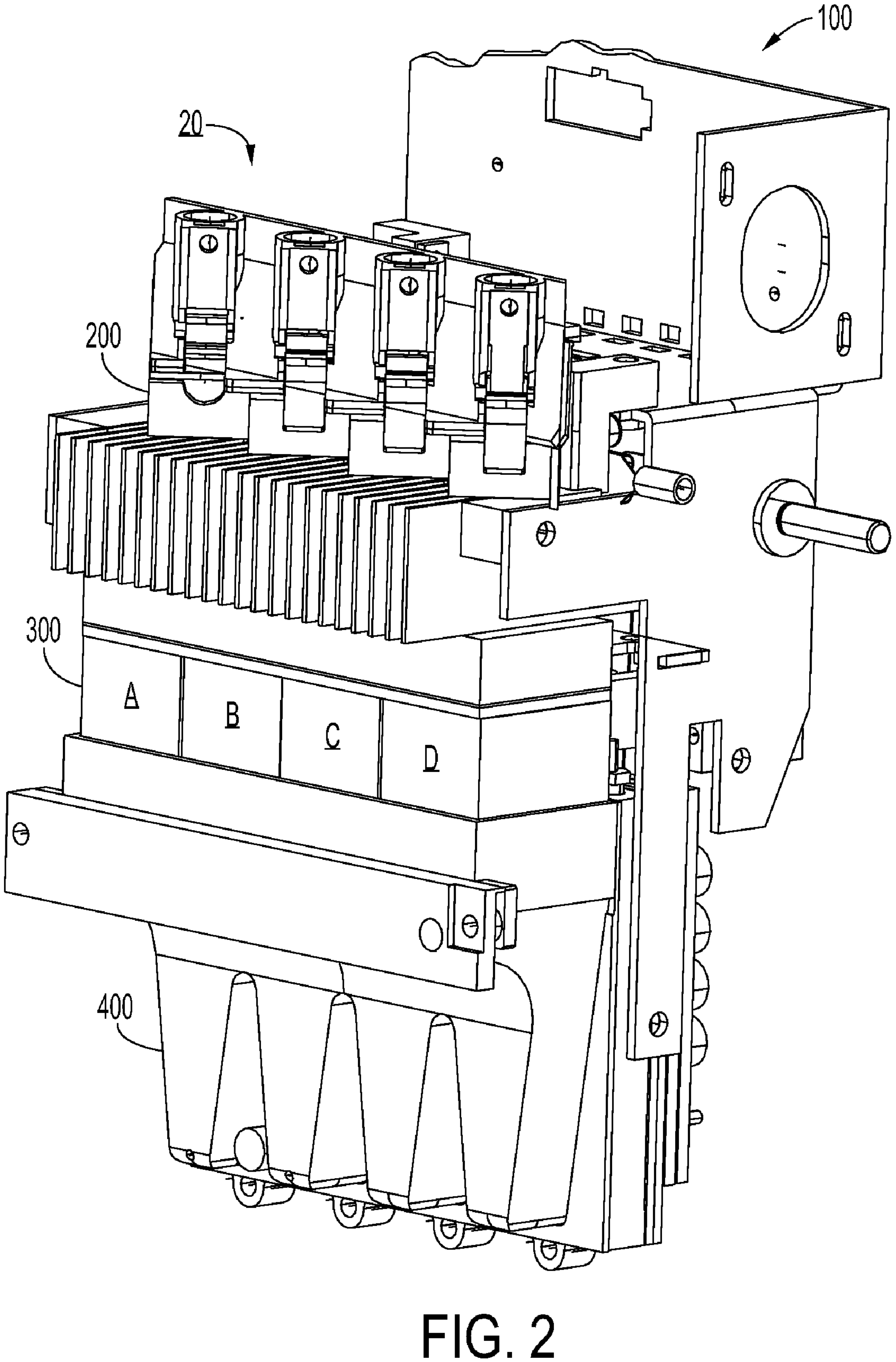
FIG. 2 (PRIOR ART)
FIG. 2 is a perspective view of a phase change ink melting and control apparatus used in the machine shown in FIG. 1.
Figure 3:
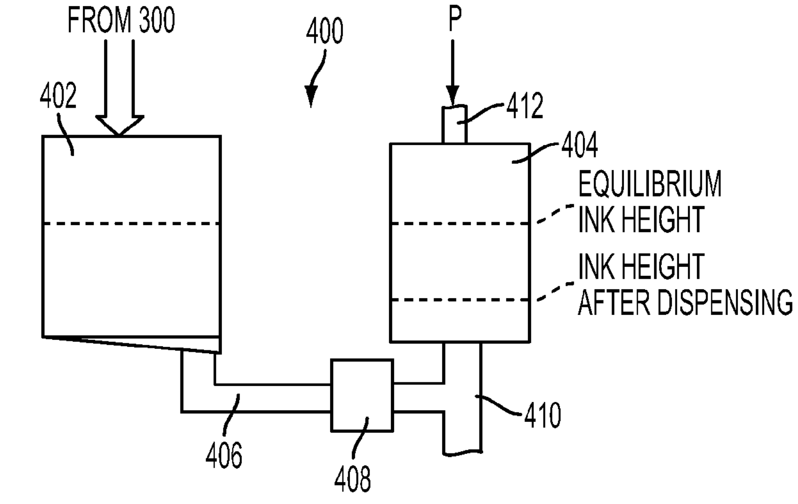
FIG. 3 is a schematic of a dual-reservoir molten liquid ink storage and control assembly according to one embodiment disclosed herein.
Figure 4:
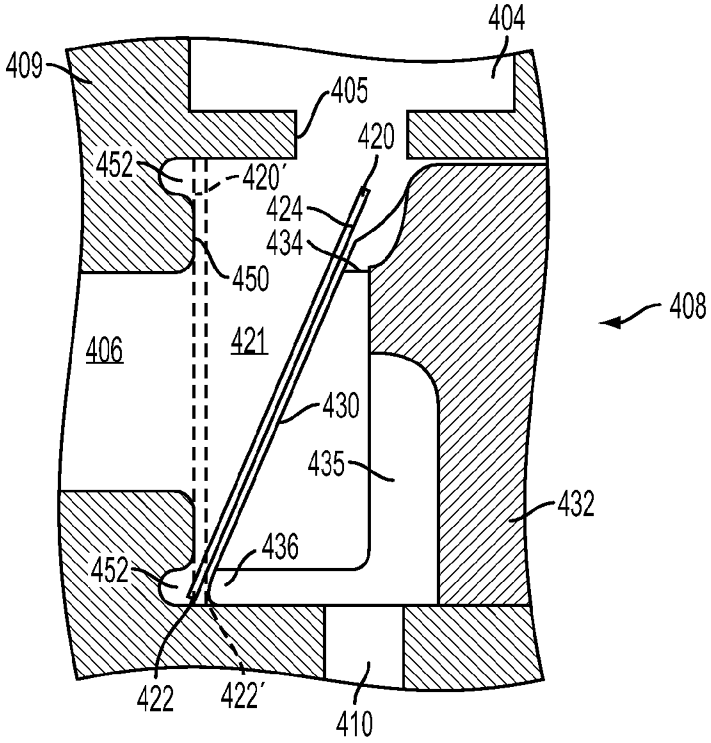
FIG. 4 is an enlarged side partial cut-away view of the valve assembly embodiment incorporated into the storage and control assembly shown in FIG. 3.
Figure 5:
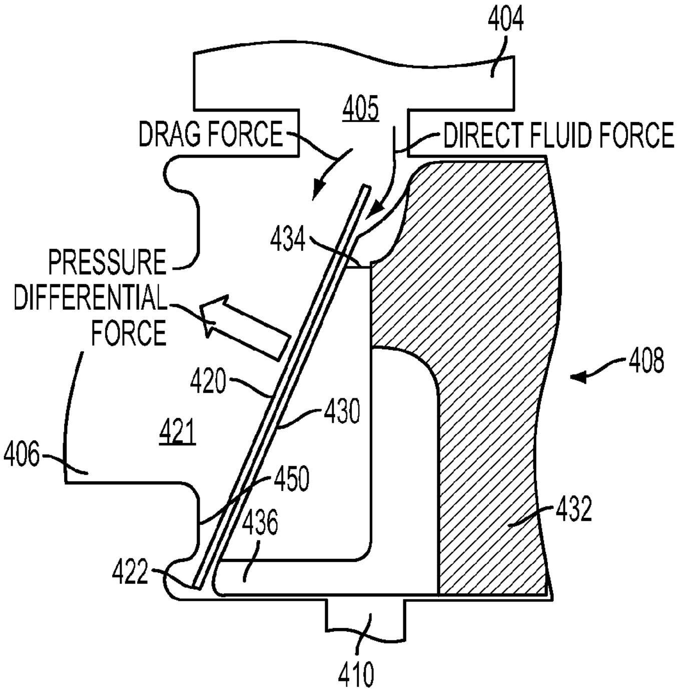
FIG. 5 is an enlarged diagram of the forces acting on the passive valve disc of the valve assembly shown in FIGS. 3-4.

According to one embodiment, the molten liquid ink storage and control assembly 400 includes a valve assembly 408 that incorporates a passive valve disc 420, as shown in FIGS. 4-5. The disc 420 is situated within a valve chamber 421 defined by a valve housing 409 between an outlet 405 of the secondary reservoir 404 and the conduit or passageway 406 that is fluidly coupled to the primary reservoir (FIG. 3). In the orientation shown in solid lines in FIG. 4, the valve disc 420 is in its "open" position that permits flow of liquid ink from the primary reservoir to the secondary reservoir. As described above, this open position flow allows equalization of the level or height of the liquid ink between the two reservoirs which occurs due to the difference in pressure head.

In one embodiment, the valve housing 409 includes an insert body 432 disposed within the valve chamber 421 configured to direct a flow of liquid ink from the secondary reservoir to the outlet 410 when pressure P is applied through port 412 to the surface of the ink within that reservoir, as described above. The insert body can thus define a flow cavity 435 that communicates between the outlet 405 and the outlet 410.

The insert body 432 further defines an angled surface 430 against which the valve disc 420 rests in the open position shown in FIGS. 4-5. The closed position of the valve disc is shown by the phantom representation of the disc 420' in which the disc is essentially vertically disposed within the valve chamber 421. More precisely, the valve disc 420' bears against a valve seat or sealing surface 450 defined by the valve housing 409 around the interface with the passageway 406. It can thus be appreciated that in this "closed" position, the valve disc 420' not only prevents flow of ink out of the primary reservoir, it also prevents ink flow into the primary reservoir. In particular, when the secondary reservoir is pressurized it is highly desirable that substantially all of the liquid ink leaving the secondary reservoir pass directly into the discharge outlet 410 to be fed to the printhead assembly 30. The fluid pressure of the molten ink forced out of the secondary reservoir 404 holds the valve disc 420 against the sealing surface 450 of the valve assembly 408.

In one aspect of the embodiment of the valve assembly 408 disclosed herein, the valve disc 420 is a passive disc, meaning that it moves to and from its open and closed position under the influence of only the liquid ink within the storage and control assembly 400. Thus, the disc 420 is freely disposed within the valve chamber 421, with its movement restrained only by the angled surface 430 and the sealing surface 450. As shown in FIG. 4, in the open position the valve disc 420 is disposed at an angle relative to the vertical (as represented by the sealing surface 450). It can be seen in comparing the open position of the valve disc 420 to the closed position of the disc 420' (shown in phantom lines), that the lower contact point or edge 422 of the disc moves between the position 422 to the position 422'. In order to prevent binding of the disc as it opens and closes, and to allow for tolerances of fit and form, an annular recess 452 may be defined around the sealing surface 450. This annular recess 452 corresponds to the outer radial extent of the valve disc so the impact on the sealing capability of the disc is minimal. In addition to providing a relief cut-out for movement of the lower contact point 422 from the closed (vertical) to the open (angled) position, the recess 452 also provides a collection area for burrs and sediment precipitating out of the molten ink that could otherwise interfere with the complete sealing of the valve disc. The recess 452 may further help ensure that the valve disc will lift off the sealing surface 450 when the pressure behind the disc (i.e., at the secondary reservoir 404) is less than the pressure in the primary reservoir 402. The circumferential clearance around the outer diameter of the disc is thus a prime contributor for ensuring disc lift off.

It can be appreciated that the valve disc 420 is moved from the closed position 420' to the open position 420 when the differential pressure between the two reservoirs favors the primary reservoir. As the liquid ink seeks the equilibrium height or level shown in FIG. 3, the gravity flow of the molten liquid ink dislodges the valve disc from the sealing surface 450, causing the disc to pivot on its lower contact point from the position 422' to the position 422.

In a high speed printing application, the valve movement must be rapid and without hesitation. In a print cycle, the secondary reservoir will be filled and an ink dose purged from the reservoir in under three seconds. Any hesitation in the opening or closing of the valve will compromise the rate of dosing of liquid ink supplied to the printhead assembly. In prior devices, the necessary opening and closing times for the valve have required the use of mechanical valves. Prior passive valve devices, such as the passive ball valve, react too slowly and allow too much back flow into the primary reservoir to permit high throughput applications.

The amount of time it takes to refill the secondary reservoir 404 after an ink dose has been discharged—i.e., the "refill rate"—is a function of the time required to open the valve disc—the "opening time"—and the amount of fluidic restriction between the two reservoirs. On the other hand, the second purpose of the valve disc 420—to prevent backflow into the primary reservoir 402—is essentially inversely related to these refill rate variables. Thus, the design considerations for preventing backflow include the time required to close the valve and the effectiveness of the seal between the valve disc 420 and the sealing surface 450. Reducing the fluidic restriction means pivoting the valve disc as far as possible to provide an open channel between the passageway 406 and the secondary reservoir 404. However, the farther the valve disc pivots to reach the open position means that the sealing face of the disc is exposed to more direct flow from the secondary reservoir that can, in the worst case, prevent the valve disc from lifting off the angled surface 430 and moving to its closed position.

Similarly, it has been determined that the "opening time" of the valve disc—i.e., the amount of time it takes the disc to dislodge from the valve seat—is a function of the area of contact between disc and sealing surface and the surface characteristics of the valve seat. The surface characteristics of the valve seat determine the physical gap that exists between the valve disc and the sealing surface when the disc is closed. The opening time decreases as either or both the area of contact decreases and the gap increases. On the other hand, the sealing efficiency necessary for optimum backflow prevention is decreased as either or both the area of contact decreases and the gap increases. In other words, sealing efficiency is improved by an increased area of contact and/or a decrease in the gap between the valve disc and the sealing surface.

In the past, this trade-off has been unmanageable in the high throughput environment. However, the embodiment of the valve assembly 400 disclosed herein is able to achieve rapid opening and closing times, rapid re-filling of the secondary reservoir and efficient sealing to prevent unwanted backflow, in the environment of a high speed printing application. Improving fluid flow during refill is accomplished without sacrificing the valve closing time by features in the port geometry at the interface between the primary and secondary reservoirs.

In the illustrated embodiment, the valve disc 420 rests at an angle established by the angled surface 430 defined by the insert body 432. The angle of the valve disc is preferably between 5 and 15 degrees. A preferred angle is 11 degrees, which has been found to provide an optimum balance between fluid flow from the passageway 406 to the reservoir 404 and the fluidic forces that act to close the disc. In order to maximize the fluid flow into the secondary reservoir, the upper end 424 of the valve disc 420 overlaps at least a portion of the outlet 405 of the secondary reservoir. In this position, the pressurized flow of ink from the secondary reservoir may tend to hold the valve disc in its open position.

Figure 6:
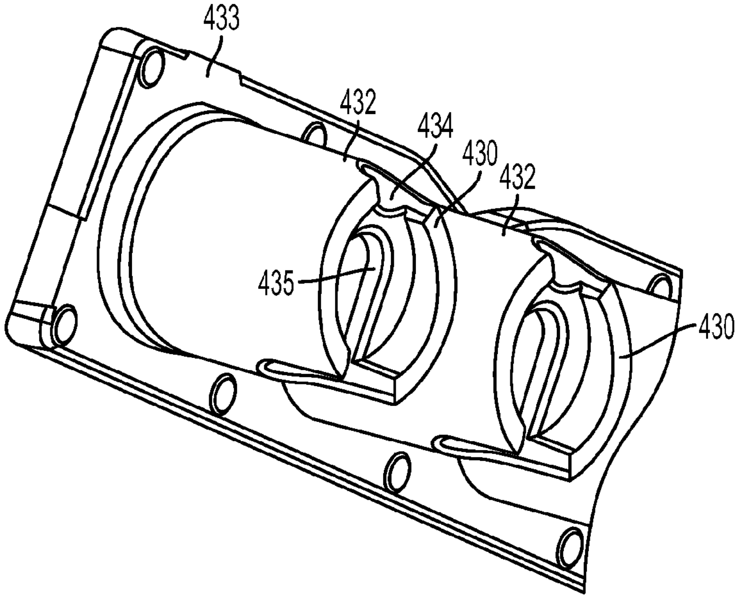
FIG. 6 is an enlarged perspective view of an insert body of the valve assembly shown in FIGS. 4-5.

Referring to FIG. 6, it can be seen that in the preferred embodiment the insert body 432 may be integrated into a mounting plate 433 along with other insert bodies corresponding to the multiple melters 300A-D. The mounting plate 433 thus facilitates engagement and removal of the insert bodies, and the corresponding angled surfaces 430, with the valve housing 409, such as to permit cleaning of the valve assembly 408. In addition, the insert bodies 432 may be preferably cylindrical in configuration to correspond to cylindrical valve chambers 421. A close fit may be established between the insert bodies and the corresponding cylindrical valve chamber, and a gasket or other sealing member may be interposed between the mounting plate 433 and the valve housing 409 to maintain a fluid-tight seal.

In a further feature of the valve assembly 408, each insert body 432 defines a flow director surface 434, as shown in FIGS. 4-6. The surface 434 is generally aligned with the outlet 405 of the reservoir and is curved to direct fluid flow against the back of the valve disc at the upper portion 424. As shown in FIG. 4, the upper portion 424 of the disc is at least partially interposed between the surface 434 and the outlet 405 in the open position, so that some of the fluid discharged from the secondary reservoir will be directed by the flow director surface 434 behind the upper portion 424 of the disc to produce a direct fluid force tending to close the valve disc, as depicted in FIG. 5. The flow director surface 434 is sized so that the unsupported upper portion 424 corresponds generally to a chord segment of the valve disc that is less than about 10% of the surface area of the disc. However, the area of this upper portion 424 may be adjusted based on the anticipated magnitude of the direct fluid force channeled by the flow director surface 434 to the back of the disc. In other words, if the pressure P is greater, a smaller area of the disc may be exposed to the flow director surface 434, since the direct fluid force and the drag force (see below) will be greater.

Of course, once the valve disc 420 has lifted off the angled surface 430 the pressurized fluid flow will bear against more of the entire back face of the disc, pushing it toward the valve seat surface 450. Furthermore, the resistance of the outlet 410 to the printhead assembly creates a local area of higher pressure which also acts on the back face of the valve disc to help close the valve. The passive valve disc 420 is arranged within the valve chamber 421 to pivot about the lower contact point or edge 422 when moving between the open and closed positions. In order to facilitate rapid movement of the valve disc to the closed position once it has lifted off the angled surface 430, the insert body 432 may be configured so that a lower portion 436 of the insert body is closely adjacent the valve seat surface 450. In particular, the gap between this lower portion 436 and the sealing surface 450 is minimized so that the movement of the lower contact point 422 is confined to pivoting. Minimizing the gap thus prevents excessive movement of the disc which could cause binding. In a specific embodiment, this gap between the lower portion 436 and the sealing surface 450 is less than twice the thickness of the valve disc 420, and preferably about 1½ times the disc thickness. Contact between the lower portion 436 and the valve disc may further act as a fulcrum as the valve disc pivots towards the closed position.

As reflected in FIG. 5, two additional forces act on the valve disc to decrease its closing time. One force is the pressure differential force immediately behind the entire valve disc that arises as the disc begins to move under the direct fluid force. In the preferred embodiment, the angled support surface 430 is annular, as shown in FIG. 6 so that the greater pressure in the flow cavity 435 behind the valve disc can produce this pressure differential. A second force is a drag force caused by fluid friction as the fluid moves across the forward (or sealing) face of the valve disc. Although this drag force is minimal and brief, it assists the valve closing by decreasing the time it takes the valve disc to lift off the angled surface 430. (It can be noted that if the open disc is at greater angle this same drag force can work against the valve as the fluid flow bears more directly against the sealing face resisting movement to the closed position.) All three of the forces represented in FIG. 5 contribute to a rapid closing time for the valve when pressure P is applied to the secondary reservoir.

With respect to the valve opening time, a further feature of the valve assembly 400 decreases the hesitancy of the valve disc 420' to pull away from the sealing surface 450, which thereby decreases the valve opening time. In particular, the surface characteristics of the valve seat or sealing surface 450 are tightly controlled. In a specific embodiment, the valve seat has a land width of up to 0.5 mm±0.1 mm for a valve disc having a diameter of 10.0 mm. Furthermore, the sealing surface 450 is machined to have a flatness of less than 10 μm and an average roughness (Ra) value of between 0.3 and 1.0 μm. In addition, the sealing surface is machined to a peak-to-valley (PV) ratio of heights of less than 10 μm across the entire disc sealing surface. The surface profile of a sealing surface in one specific embodiment is depicted in the graph of FIG. 6.

Figure 7:
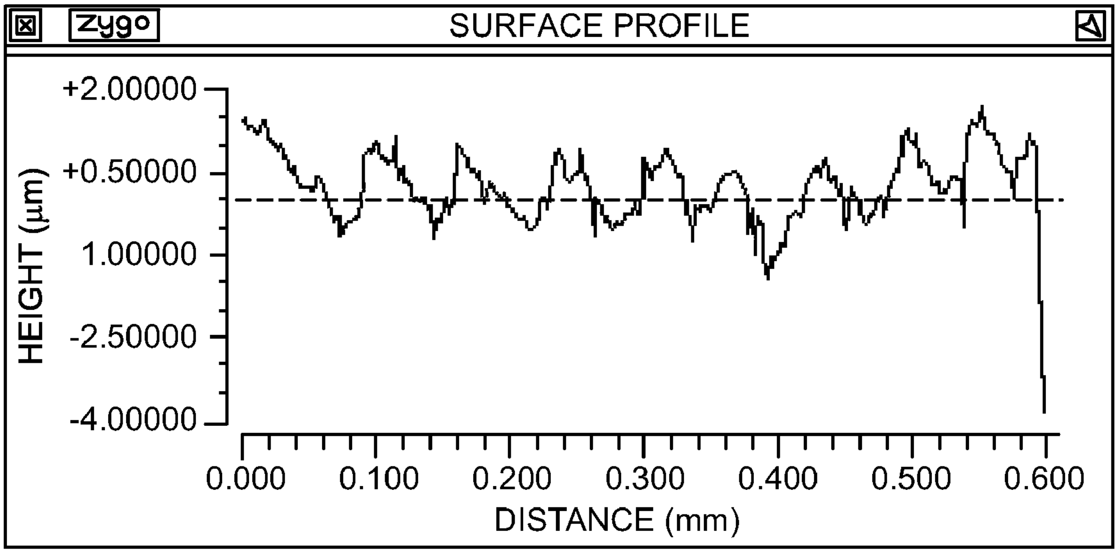
FIG. 7 is a graphical representation of the surface profile of one embodiment of the valve disc depicted in FIG. 5.
Figure 8:
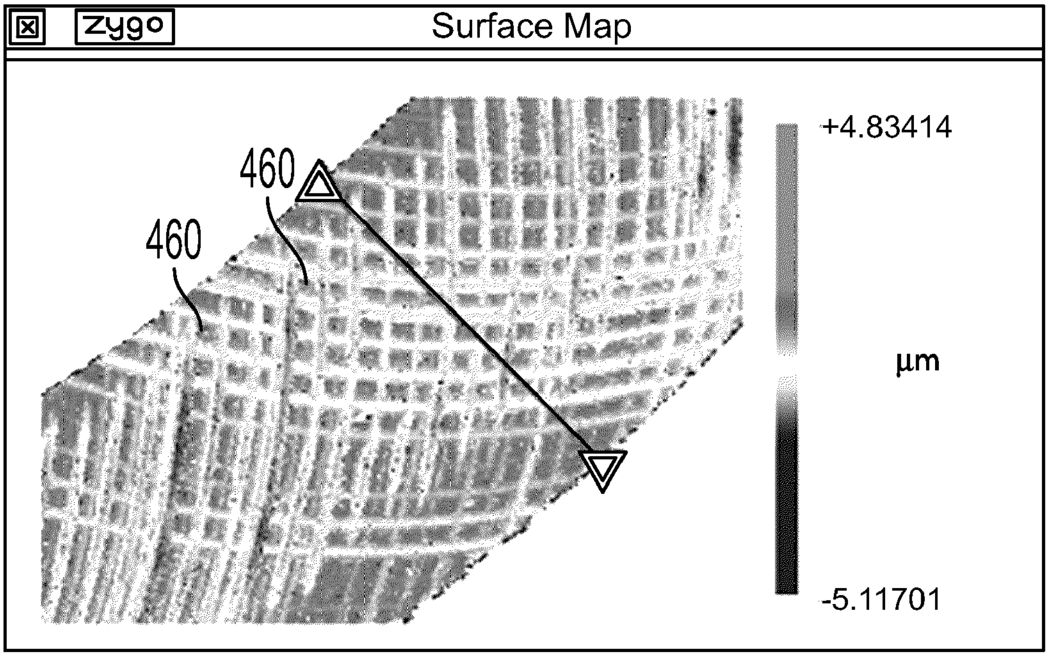
FIG. 8 is a representation of a microscopic surface map of one embodiment of the valve disc depicted in FIG. 5.

In addition to maintaining these surface characteristics, the manner of machining the sealing surface contributes to its optimized performance. In particular, the surface is machined so that cutter marks from the milling machine serve as "micro-channels" or fluid flow paths through which fluid pressure can equilibrate, thereby reducing the initial opening, or "crack", time. An exemplary machined surface is shown in the microscopic surface image of FIG. 7. It can be seen in this picture that the circular milling pattern creates distinct grooves or micro-channels 460 through which fluid may flow. It can be appreciated that the micro-channels 460 correspond to the PV values in the graph of FIG. 6. The PV value in conjunction with the Ra value define the surface characteristics of the sealing surface 450 in terms that permit fluid flow to minimize the valve "crack" time, while preserving sufficient sealing capabilities. In the specific example, it was found that only about 0.3% of the liquid ink in a particular dose leaked past the sealed valve disc 420'. On the other hand, the surface characteristics described above allow the exemplary valve to crack open in about 100 msec, and to fully open in less than 500 msec. In a high speed application, the valve disc will typically be closed for only a very short time, on the order of 1.0 sec, before it is required to open again to refill the secondary reservoir.

In the exemplary embodiment described above, the surface milling machine was operated at a spindle speed of 12000 rpm with an end mill feed speed of 7 in./min. and 450 surface ft./min. It is contemplated that the speed and feed rates of the end mill will be calibrated based on the material of the valve seat and the particular application. In the embodiments described herein, the sealing surface is formed by an end mill. However, other methods of generating the sealing surface, while adhering to the surface characteristics described above, can be used, such as stamping, sanding or etching. This embodiment has been demonstrated to maintain performance to 2.5 million cycles without any noticeable degradation.

In another aspect of the valve design disclosed herein, the valve seat or sealing surface 450 is preferably formed of a "softer" or less wear-resistant material than the valve disc. Thus, the majority of the wear that occurs will be on the sealing surface, rather than on the valve disc. The effect of this wear is to reduce the surface roughness over time, which has the effect of improving the sealing efficiency of the valve disc. While the opening time will increase, the impact is reduced by the presence of the machining channels or grooves that allow for pressure equilibrium on either side of the valve disc. In a specific embodiment, the valve disc is formed of a stainless steel while the sealing surface is formed of aluminum.

The valve disc 420 is preferably circular to correspond to a cylindrical valve chamber 421, an annular valve seat sealing surface 450 and an annular angled surface 430. However, other configurations for the valve disc are contemplated based on the geometry of the valve assembly within which the disc is disposed. For instance, rather than cylindrical, the components may adopt alternate multi-sided shapes.

The valve disc is sufficiently thick to avoid bending when moving under pressure between the open and closed positions. On the other hand, the thickness of the valve disc 420 is sufficiently thin to keep the mass of the disc to a minimum, since the mass of the disc will affect how rapidly it can move from one position to another. In a specific embodiment for use in a high speed solid ink printer, the valve disc has a thickness of about 0.3 mm.

It will be appreciated that various of the above-described features and functions, as well as other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. In a high-speed phase change ink image producing machine having a printhead system and a system for feeding and controlling melted liquid ink provided to the printhead system, the feeding and controlling system having a first storage reservoir for receiving and holding a first volume of melted ink from a source and a second storage reservoir for holding a second volume of melted ink to be delivered to the printhead system upon pressurization of the second storage reservoir, a valve assembly operable in an open position to control the flow of melted ink from the first storage reservoir to the second storage reservoir and in a closed position to prevent backflow into the first storage reservoir of melted ink being delivered under pressure to the printhead system, said valve assembly comprising:

a valve housing defining a valve seat between the first and second reservoirs, said valve seat having a sealing surface with a plurality of micro-channels defined therein to permit fluid flow therethrough when said valve disc abuts said valve seat, said sealing surface having an average surface roughness of between 0.3 and 1.0 μm;

an angled surface disposed within said valve housing; and a passive valve disc disposed within said valve housing and movable from the closed position in which said disc abuts said valve seat in sealed contact, and the open position in which said valve disc is supported by said angled surface, wherein said angled surface is configured to support only a portion of said valve disc with an upper portion thereof unsupported; and further wherein said valve housing defines a flow director surface at said upper portion of said valve disc on the opposite side of said disc from said valve seat, said flow director surface in fluid communication with the second reservoir to direct a flow of melted ink behind said valve disc.

2. The valve assembly according to claim 1, wherein said angled surface is configured to support said valve disc at an angle of between five and fifteen degrees (5-15°) relative to said valve seat.

3. The valve assembly according to claim 2, wherein said angled surface if configured to support said valve disc at an angle of eleven degrees (11°).

4. The valve assembly according to claim 1, in which the second reservoir includes an outlet, wherein:

said flow director surface of said valve housing is in fluid communication with the outlet of the second reservoir; and said upper portion of said valve disc is disposed between the outlet and said flow director surface in the open position.

5. The valve assembly according to claim 1, wherein said upper portion of said valve disc is approximately twenty percent (20%) of the maximum dimension of said valve disc.

6. The valve assembly according to claim 1, wherein said sealing surface has a peak-to-valley ratio of heights of less than about 10 μm across said entire sealing surface.

7. The valve assembly according to claim 1, wherein said valve seat is formed of a material that is less wear resistant than the material of said valve disc.

8. The valve assembly according to claim 1, wherein said valve housing defines an outlet chamber in fluid communication with the second reservoir having an outlet in fluid communication with the printhead system, said outlet chamber forming said angled surface.

9. The valve assembly according to claim 1, wherein:

said valve housing defines a recess outboard of said valve seat; and said valve disc is sized so that a lower edge thereof extends at least partially into said recess when said valve disc is supported by said angled surface in the open position.

10. The valve assembly according to claim 9, wherein a lower portion of said angled surface adjacent said lower edge of said valve disc is offset from said valve seat by a gap that is less than twice the thickness of said valve disc at said lower edge.

11. In a high-speed phase change ink image producing machine having a printhead system and a system for feeding and controlling melted liquid ink provided to the printhead system, the feeding and controlling system having a first storage reservoir for receiving and holding a first volume of melted ink from a source and a second storage reservoir for holding a second volume of melted ink to be delivered to the printhead system upon pressurization of the second storage reservoir, a valve assembly operable in an open position to control the flow of melted ink from the first storage reservoir to the second storage reservoir and in a closed position to prevent backflow into the first storage reservoir of melted ink being delivered under pressure to the printhead system, said valve assembly comprising:

a valve housing defining a valve seat between the first and second reservoirs;

an angled surface disposed within said valve housing; and a passive valve disc disposed within said valve housing and movable from the closed position in which said disc abuts said valve seat in sealed contact, and the open position in which said valve disc is supported by said angled surface, wherein said valve seat defines a sealing surface having a plurality of micro-channels defined therein to permit fluid flow therethrough when said valve disc abuts said valve seat, said sealing surface has an average surface roughness of between 0.3 and 1.0 μm.

12. The valve assembly according to claim 11, wherein said valve housing defines a recess outboard of said sealing surface, said valve disc sized to cover said recess when in the closed position.

13. The valve assembly of claim 12, wherein said valve disc is circular and said sealing surface and recess are annular.

14. The valve assembly according to claim 11, wherein said sealing surface has a peak-to-valley ratio of heights of less than about 10 μm across said entire sealing surface.

15. The valve assembly according to claim 11, wherein said valve seat is formed of a material that is less wear resistant than the material of said valve disc.

16. The valve assembly according to claim 15, wherein said valve seat material is aluminum and said valve disc material is stainless steel.

17. In a high-speed phase change ink image producing machine having a printhead system and a system for feeding and controlling melted liquid ink provided to the printhead system, the feeding and controlling system having a first storage reservoir for receiving and holding a first volume of melted ink from a source and a second storage reservoir for holding a second volume of melted ink to be delivered to the printhead system upon pressurization of the second storage reservoir, a valve assembly operable in an open position to control the flow of melted ink from the first storage reservoir to the second storage reservoir and in a closed position to prevent backflow into the first storage reservoir of melted ink being delivered under pressure to the printhead system, said valve assembly comprising:

a valve housing defining a valve seat between the first and second reservoirs;

an angled surface disposed within said valve housing; and a passive valve disc disposed within said valve housing and movable from the closed position in which said disc is in sealed contact with said valve seat, and the open position in which said valve disc is supported by said angled surface, wherein said valve seat defines a sealing surface having an average surface roughness of between 0.3 and 1.0 μm and a peak-to-valley ratio of heights of less than about 10 μm across said entire sealing surface.

18. The valve assembly according to claim 17, wherein said valve seat is formed of a material that is less wear resistant than the material of said valve disc.

19. The valve assembly according to claim 18, wherein said valve seat material is aluminum and said valve disc material is stainless steel.

* * * * *